US012663627B2

(12) United States Patent
    Chiou

(10) Patent No.:     US 12,663,627 B2
(45) Date of Patent:     Jun. 23, 2026

(54) IMAGING SYSTEM AND PROJECTION APPARATUS

(71) Applicant: Coretronic Corporation, Hsin-Chu (TW)

(72) Inventor: Shih-Chen Chiou, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 662 days.

(21) Appl. No.: 18/090,523

(22) Filed: Dec. 29, 2022

(65) Prior Publication Data

US 2023/0236397 A1     Jul. 27, 2023

(30) Foreign Application Priority Data

Jan. 24, 2022     (CN) .......................... 202220179657.9

(51) Int. Cl.
    *G02B 17/08*          (2006.01)
    *G03B 21/20*          (2006.01)
(52) U.S. Cl.
    CPC ....... *G02B 17/0856* (2013.01); *G03B 21/208* (2013.01)
(58) Field of Classification Search
    None
    See application file for complete search history.

(56) References Cited

U.S. PATENT DOCUMENTS

2017/0038571 A1     2/2017   Daugela

FOREIGN PATENT DOCUMENTS

CN          101749557 B   *   8/2011

* cited by examiner

*Primary Examiner* — Bao-Luan Q Le
*Assistant Examiner* — Danell L Owens
(74) *Attorney, Agent, or Firm* — JCIPRNET

(57)                    ABSTRACT

An imaging system configured to convert an illumination beam into an image beam includes a first prism including a first surface and a second surface, a second prism, and a light valve. An included angle between the first surface and the second surface is an acute angle. The illumination beam is sequentially transmitted to the first prism, the second prism, and the light valve. The light valve is configured to convert the illumination beam into the image beam, and the image beam is then transmitted to and passes the second prism. A first incident direction of the illumination beam incident on the first prism is perpendicular to a first exit direction of the illumination beam exiting from the first prism. Beam cross-sectional areas of the illumination beam before incident on and after exiting from the first prism are different. A projection apparatus including the imaging system is also provided.

24 Claims, 5 Drawing Sheets

240

240S2

240S1

$\alpha'$ $\phi'$

I

Wout

R2

210S2

Win

210S1

210

Y(D2,D3)

X(D1)

Z(D4)

IMAGING SYSTEM AND PROJECTION APPARATUS

CROSS-REFERENCE TO RELATED APPLICATION

This application claims the priority benefit of China application serial no. 202220179657.9 filed on Jan. 24, 2022. The entirety of the above-mentioned patent application is hereby incorporated by reference herein and made a part of this specification.

BACKGROUND

Technical Field

The disclosure relates to an optical system and an optical apparatus, and in particular, relates to an imaging system and a projection apparatus.

Description of Related Art

In the technology of conversion of projected aspect ratios in projectors, three methods are commonly provided. In the first method, an anamorphic lens is externally attached. In this method, a converging cylindrical lens is usually used to focus the light, and a diverging cylindrical lens is also used to converge the light, so as to converge and expand the single-dimensional length of the light spot in the lens optical system. In short, this method may be used to change the projected aspect ratio. However, when this method is used together with a native projection lens, the problem of image distortion or poor resolution may occur.

In the second method, to control the digital micro-mirror device (DMD) to split image. The image scale is scaled by an algorithm, and the micro-mirror outside the image is turned off to make the outside of the image a dark screen. Compared with the first method, the disadvantage of the anamorphic lens is that the brightness may decrease, but the costs are lower, and an external lens is not additionally required.

In the third method, digital micro-mirror devices of different resolutions are used for replacement to change the projected aspect ratio. When this method is performed, it is necessary to pay attention to whether the illumination profile hitting the digital micro-mirror device is larger than the effective working area of the digital micro-mirror device.

However, the abovementioned second and third methods have the following problems. First, the digital micro-mirror devices of different resolutions need to be used together with different optical engines, so the costs are high. Second, large-sized digital micro-mirror devices may be backward compatible with small-sized digital micro-mirror devices, but its overfilled region may result in high brightness loss.

The information disclosed in this BACKGROUND section is only for enhancement of understanding of the background of the described technology and therefore it may contain information that does not form the prior art that is already known to a person of ordinary skill in the art. Further, the information disclosed in the BACKGROUND section does not mean that one or more problems to be resolved by one or more embodiments of the invention was acknowledged by a person of ordinary skill in the art.

SUMMARY

The disclosure provides an imaging system and a projection apparatus suitable for outputting image beams with different aspect ratios and having improved compatibility with light valves of different resolutions.

Other features and advantages of the disclosure are disclosed by the technical features broadly embodied and described as follows.

In order to achieve one or a portion of or all of the objects or other objects, an embodiment of the disclosure provides an imaging system configured to convert an illumination beam into an image beam and including a first prism, a second prism, and a light valve. The first prism includes a first surface and a second surface. An included angle between the first surface and the second surface is an acute angle. The illumination beam is sequentially transmitted to the first prism, the second prism, and the light valve. The light valve is configured to convert the illumination beam into the image beam, and the image beam is then transmitted to the second prism and passes the second prism. The illumination beam is incident to the first prism with a first incident direction, and exits the first prism with a first exit direction, the first incident direction is perpendicular to the first exit direction. Beam cross-sectional areas of the illumination beam before incident on and after exiting from the first prism are different.

An embodiment of the disclosure provides a projection apparatus including a light source, an imaging system, and a projection lens. The light source is configured to provide an illumination beam. The imaging system is configured to convert the illumination beam into an image beam. The projection lens is disposed on a transmission path of the image light beam and is configured to project the image light beam out of the projection apparatus. The imaging system includes a first prism, a second prism, and a light valve. The first prism includes a first surface and a second surface. An included angle between the first surface and the second surface is an acute angle. The illumination beam is incident on the first prism, exits from the first prism, is transmitted to the second prism, is transmitted to the light valve through the second prism, and is then converted into the image beam by the light valve sequentially, and the image beam is then transmitted to and exits from the second prism. The illumination beam is incident to the first prism with a first incident direction, and exits the first prism with a first exit direction, the first incident direction is perpendicular to the first exit direction. Beam cross-sectional areas of the illumination beam before incident on and after exiting from the first prism are different.

To sum up, in an embodiment of the disclosure, since the projection apparatus or the imaging system is provided with the first prism and the beam cross-sectional areas of the illumination beam before incident on and after exiting from the first prism are different owing to the arrangement of the first prism, the projection apparatus or the imaging system is highly compatible with the light valve, and the costs are thereby lowered. Further, since an external anamorphic lens is not additionally required, in the projection apparatus or the imaging system provided by an embodiment of the disclosure, the imaging effect is improved, and the overall volume of the optical engine is further decreased.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
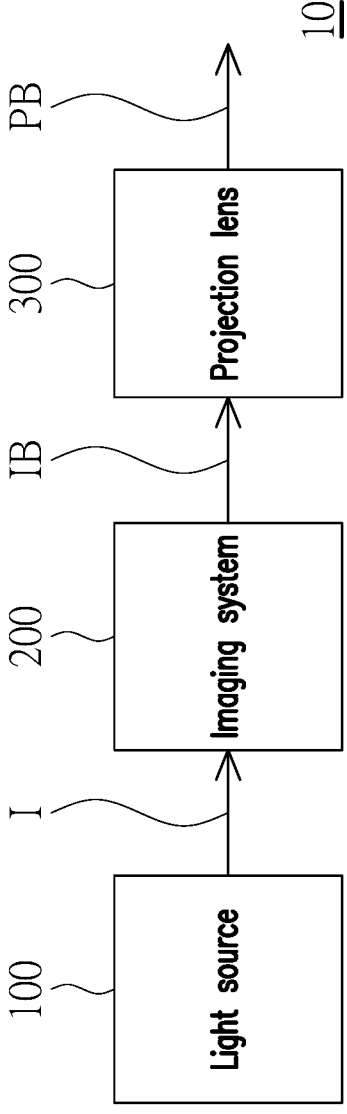
FIG. 1 is a schematic diagram of a projection apparatus according to an embodiment of the disclosure.

FIG. 1 is a schematic diagram of a projection apparatus according to an embodiment of the disclosure. With reference to FIG. 1, an embodiment of the disclosure provides a projection apparatus 10 including a light source 100, an imaging system 200, and a projection lens 300. The light source 100 is configured to provide an illumination beam I. The imaging system 200 is configured to convert the illumination beam I in to an image beam IB. The projection lens 300 is disposed on a transmission path of the image beam IB and is configured to project the image beam IB out of the projection apparatus 10 to from a projection beam PB.

To be specific, the light source 100 provided by this embodiment is a laser diode (LD), a light emitting diode (LED), or other suitable light sources or a combination thereof. The illumination beam I may include a red light beam, a green light beam, a blue light beam, or other color beams or a combination thereof. In another embodiment, the light source 100 may include a light-homogenizing element, and the illumination beam I is formed after the light beam emitted by the light-emitting element of the light source 100 passes through the light-homogenizing element. The light-homogenizing device is, for example, an integration rod, a lens array (e.g., a fly-eye lens array) or other optical devices with light-homogenization effects, but the disclosure is not limited thereto. Besides, the projection lens 300 is, for example, a combination including one or more optical lenses having refracting powers. The optical lenses include various combinations of a biconcave lens, a biconvex lens, a concave-convex lens, a convex-concave lens, a plane-convex lens, and a plane-concave lens, for example. A form and a type of the projection lens 300 is not particularly limited in the disclosure.

Figure 2:
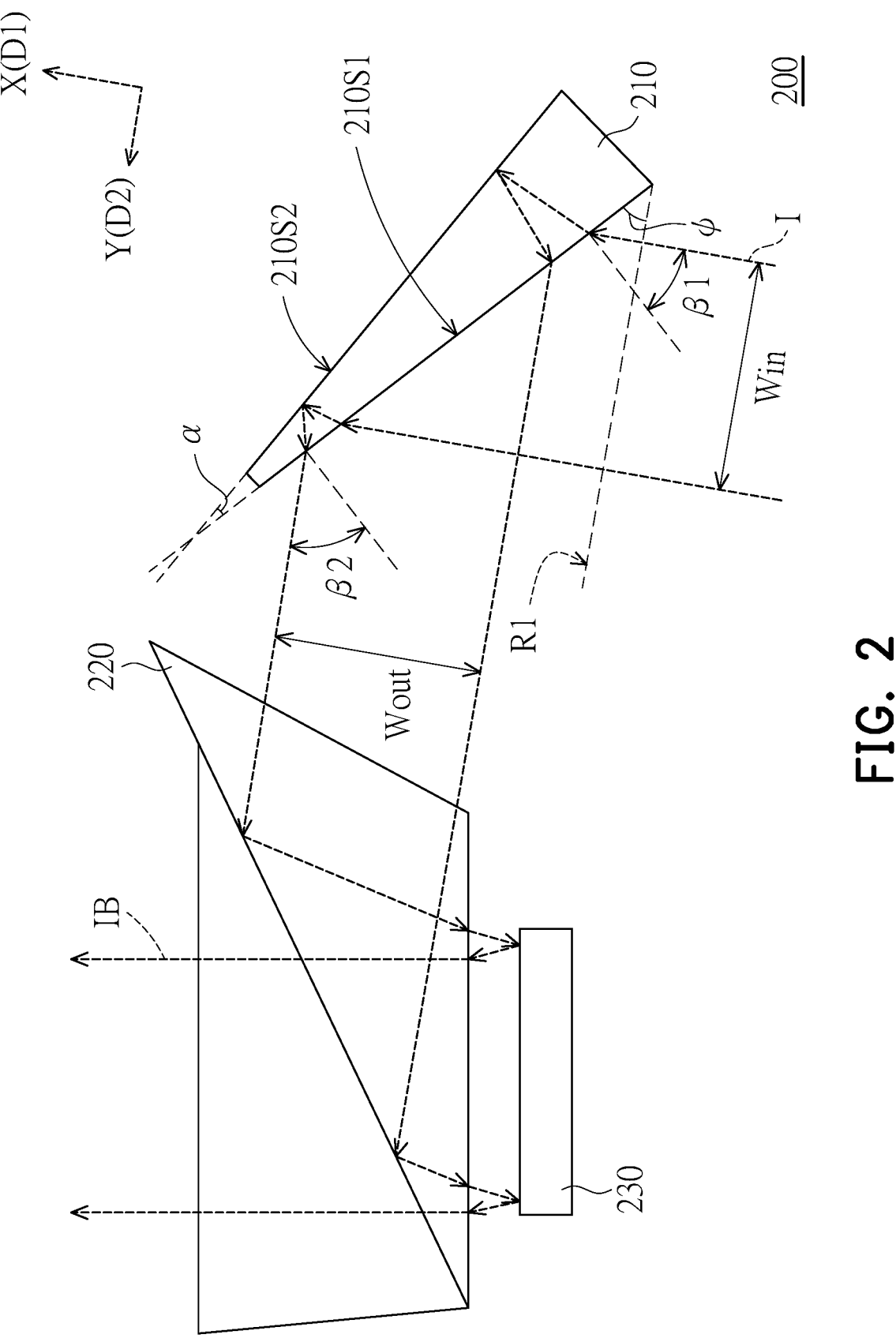
FIG. 2 is a schematic diagram of an imaging system according to a first embodiment of the disclosure.

FIG. 2 is a schematic diagram of an imaging system according to a first embodiment of the disclosure. With reference to FIG. 2, in this embodiment, an imaging system 200 includes a first prism 210, a second prism 220, and a light valve 230. The light valve 230 is a spatial light modulator such as a digital micro-mirror device, a liquid-crystal-on-silicon panel (LCOS panel), or a liquid crystal panel. In addition, the second prism 220 may be a total internal reflection (TIR) prism.

In this embodiment, the first prism 210 includes a first surface 210S1 and a second surface 210S2. An included angle α between the first surface 210S1 and the second surface 210S2 is an acute angle. The illumination beam I is incident on the first prism 210, exits from the first prism 210, is transmitted to the second prism 220, is transmitted to the light valve 230 through the second prism 220, and is then converted into the image beam IB by the light valve 230 sequentially. The image beam IB is then transmitted to the second prism 220, and then exits from the second prism 220. The illumination beam I is incident to the first prism 210 (the first surface 210S1) with a first incident direction D1, and exits the first prism 210 (the first surface 210S1) with a first exit direction D2, where the first incident direction D1 is perpendicular to the first exit direction D2. Herein, the incident direction D1 is defined by a traveling path of a main light beam of the illumination beam I, and a direction thereof may be leftward, rightward, upward, obliquely forward, etc. in space. The intersection line of the first surface 210S1 and the second surface 210S2 is, for example, perpendicular to the first incident direction D1 and the first exit direction D2.

In this embodiment, when the illumination beam I is transmitted to the first prism 210, the illumination beam I sequentially passes through the first surface 210S1, is reflected by the second surface 210S2, and then passes through the first surface 210S1 to exit from the first surface 210.

In this embodiment, the illuminating beam I is incident to the first surface 210S1 with a first incident angle β1, and exits from the first surface 210S1 with a first exit angle β2, where a difference between the first incident angle β1 and the first exit angle β2 falls within a range of 0 degrees to 15 degrees. Therefore, the above range of the difference limit can keep an optical path of the light beam in the imaging system 200 within an tolerance range, and further improve the quality of the image beam IB or the projection beam PB.

In this embodiment, the imaging system 200 satisfies a conditional formula as follows:

$$\alpha = \sin^{-1}\left[\left(\frac{n1}{n2}\right) \times (90 - \varphi)\right] - \sin^{-1}\left[\left(\frac{n1}{n2}\right) \times \varphi\right],$$

where n1 is a refractive index of a transmission medium (e.g., air) outside the first prism 210, n2 is a refractive index of the first prism 210, φ is an included angle between the first surface 210S1 and a first reference plane R1 (e.g., a YZ plane shown in FIG. 2), and the first reference plane R1 is a plane perpendicular to the first incident direction D1. In this embodiment, the included angle α between the first surface 210S1 and the second surface 210S2 (the angle between the two surfaces or the angle between the extension planes of the two surfaces) is closer to the second prism 220 (i.e., components located downstream of the optical path) than other parts of the first prism 210.

Figure 3:
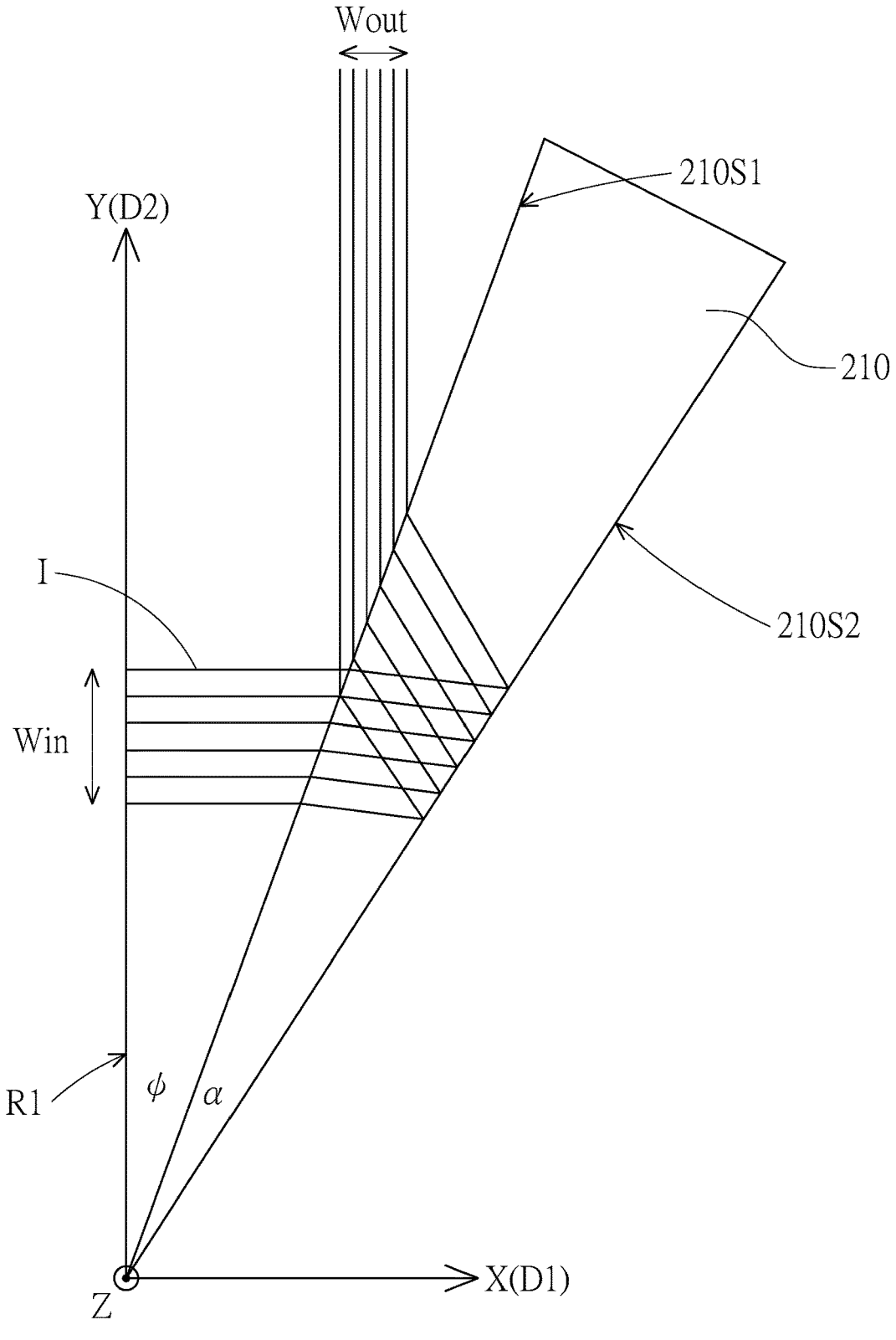
FIG. 3 is a schematic diagram of a first prism according to another embodiment of the disclosure.

In this embodiment, after the illumination beam I exits from the first surface 210S1, the illumination beam I is expanded in a direction parallel to the first incident direction D1. In this way, beam cross-sectional areas Win and Wout (the cross-sectional area of the plane perpendicular to the traveling direction of the illumination beam I) of the illumination beam I before incident on and after exiting from the first surface 210S1 of the first prism 210 are different (the beam cross-sectional area before incident is smaller than the beam cross-sectional area after exiting). However, the arrangement of the first prism 210 in the disclosure is not limited thereof. In other embodiments, for instance, FIG. 3 is a schematic diagram of a first prism according to another embodiment of the disclosure. In FIG. 3, the included angle α between the first surface 210S1 and the second surface 210S2 of the first prism 210 is farther away from the second prism 220 than other parts of the first prism 210. The included angle α is 12.8 degrees, and the included angle φ is 20 degrees, so that the illumination beam I is converged by the first prism 210.

Based on the above, in an embodiment of the disclosure, the projection apparatus 10 or the imaging system 200 is provided with the first prism 210, and the included angle α between the first surface 210S1 and the second surface 210S2 of the first prism 210 is an acute angle. In this way, the beam cross-sectional areas Win and Wout of the illumination beam I before incident on and after exiting from the first prism 210 are different. Therefore, compared with the existing method of conversion of projected aspect ratios in projectors, the projection apparatus 10 or the imaging system 200 provided by an embodiment of the disclosure is highly compatible with the light valve 230, thereby reduce the production cost, and has better imaging effect, and an overall volume of an optical engine is further decreased. Besides, in the projection apparatus 10 or the imaging system 200 of the disclosure, the first incident direction D1 and the first exit direction D2 are restricted to be perpendicular to each other, so that efficiency drop caused by an excessive angular decrease is avoided.

Figure 4:
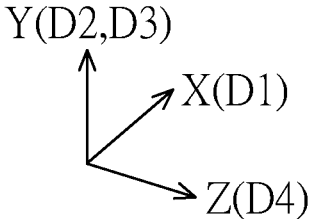
FIG. 4 is a schematic diagram of an imaging system according to a second embodiment of the disclosure.

FIG. 4 is a schematic diagram of an imaging system according to a second embodiment of the disclosure, where the second prism and the light valve are omitted in FIG. 4. With reference to FIG. 4, an imaging system provided in FIG. 4 is similar to the imaging system provided in FIG. 3, and a difference therebetween is as follows. In this embodiment, the projection apparatus or the imaging system further includes a third prism 240. The third prism 240 includes a third surface 240S1 and a fourth surface 240S2. An included angle α' between the third surface 240S1 and the fourth surface 240S2 is an acute angle. The illumination beam I is incident on the third prism 240, exits from the third prism 240, and is then transmitted to the second prism 220 sequentially after exiting from the first prism 210. The illuminating beam I is incident on the third prism 240 in a second incident direction D3 (the Y-axis direction in FIG. 4), and exits from the third prism 240 in a second exit direction D4 (the Z-axis direction in FIG. 4). The second incident direction D3 and the second exit direction D4 are perpendicular to each other. The second incident direction D3 is parallel to the abovementioned first exit direction D2.

In this embodiment, the illumination beam I sequentially penetrates the third surface 240S1, reflects off the fourth surface 240S2, penetrates the third surface 240S1 again, and exits from the third prism 240.

In this embodiment, the imaging system satisfies a conditional formula as follows:

$$\alpha' = \sin^{-1}\left[\left(\frac{n1'}{n2'}\right) \times (90 - \varphi')\right] - \sin^{-1}\left[\left(\frac{n1'}{n2'}\right) \times \varphi'\right],$$

where n1' is a refractive index of a transmission medium (e.g., air) outside the third prism 240, n2' is a refractive index of the third prism 240, φ' is an included angle between the third surface 240S1 and a second reference plane R2 (an XZ plane as shown in FIG. 4), and the second reference plane R2 is a plane perpendicular to the second incident direction D3. In this embodiment, the intersection line of the first surface 210S1 and the second surface 210S2 is, for example, parallel to the Z-axis direction, and the intersection line of the third surface 240S1 and the fourth surface 240S2 is, for example, parallel to the X-axis direction.

In this embodiment, with the arrangement of the third prism 240, after the illumination beam I exits from the third surface 240S1, the illumination beam I is converged in a direction parallel to the second incident direction D3. In this way, the beam cross-sectional areas of the illumination beam I before incident on and after exiting from the third surface 240S1 of the third prism 240 are different (the beam cross-sectional area before incident is larger than the beam cross-sectional area after exiting). That is, the beam cross-sectional areas of the illumination beam I before incident on the first prism 210 and after exiting from the third prism 240 are converged in the first incident direction D1 and the second incident direction D3. Herein, the first incident direction D1 and the second incident direction D3 are different. In other embodiment, the illuminating beam I can be expanded or converged in different directions according to different arrangements of the first prism 210 and the third prism 240.

In this embodiment, the illumination beam I enters the second prism 220, and is reflected by the second prism 220 to the light valve 230 after exiting from the third prism 240. The image beam IB enters, penetrates, and exits from the second prism 220 after being transmitted to the second prism 220 from the light valve 230.

In addition, in an embodiment, a difference between a second incident angle of the illumination beam I incident on the third surface 240S1 and a second exit angle of the illumination beam I exiting from the third surface 240S1 falls within a range of 0 degrees to 15 degrees.

Based on the above, in an embodiment of the disclosure, the projection apparatus or the imaging system is provided with the first prism 210 and the third prism 240. 0The first prism 210 and the third prism 240 respectively allows the illumination beam I to be expanded or converged in the first incident direction D1 and the second incident direction D3. Therefore, in the projection apparatus or the imaging system, an area ratio of the projection beam PB may be changed while a system size is effectively controlled. The remaining advantages of the projection apparatus or the imaging system provided by an embodiment of the disclosure are similar to that of the projection apparatus 10 in FIG. 1 or the imaging system 200 in FIG. 2, and description thereof is not repeated herein.

Figure 5:
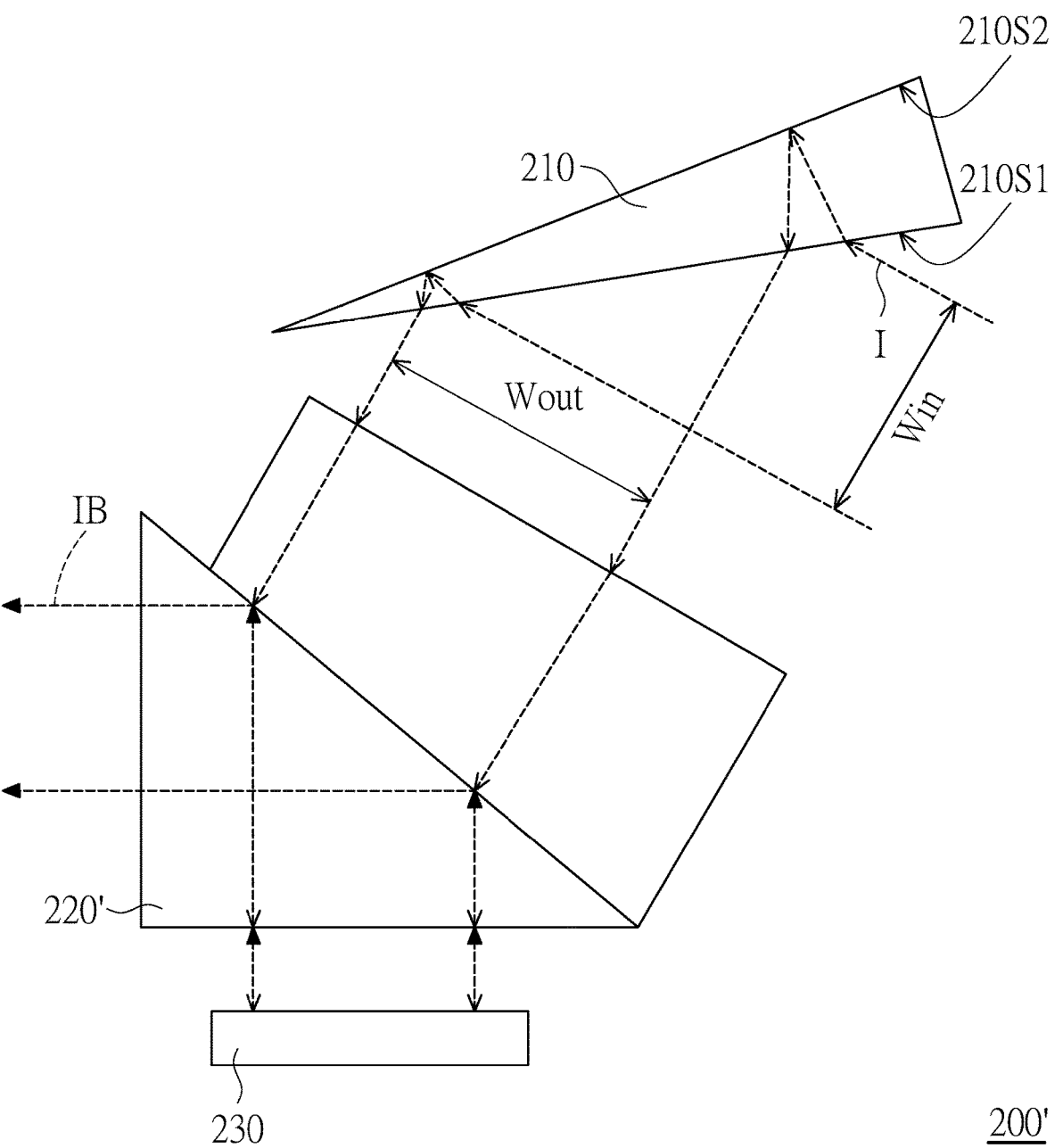
FIG. 5 is a schematic diagram of an imaging system according to a third embodiment of the disclosure.

FIG. 5 is a schematic diagram of an imaging system according to a third embodiment of the disclosure. With reference to FIG. 5, an imaging system 200' provided herein is similar to the imaging system 200 provided in FIG. 2, and a difference therebetween is as follows. In this embodiment, a second prism 220' may be a reverse total internal reflection (RTIR) prism. Herein, the illumination beam I is transmitted to the light valve 230 after entering and passing through the second prism 220'. The image beam IB is reflected by, penetrates, and exits from the second prism 220' after being transmitted to the second prism 220' from the light valve 230. The advantages of the imaging system 200' provided by this embodiment is similar to that of the imaging system 200 in FIG. 2, and description thereof is not repeated herein.

In view of the foregoing, in an embodiment of the disclosure, since the projection apparatus or the imaging system is provided with the first prism and the included angle between the first surface and the second surface of the first prism is an acute angle, the beam cross-sectional areas of the illumination beam before incident on and after exiting from the first prism are different. Therefore, the projection apparatus or the imaging system is highly compatible with the light valve, and the costs of molds are thereby lowered. Further, since an external anamorphic lens is not additionally required, in the projection apparatus or the imaging system provided by an embodiment of the disclosure, the imaging effect is improved, and the overall volume of the optical engine is further decreased. Besides, in the projection apparatus or the imaging system, the first incident direction of the illumination beam incident on the first prism and the first exit direction of the illumination beam exiting from the first prism are restricted to be perpendicular to each other, so that the efficiency drop caused by the excessive angular decrease is avoided.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An imaging system, configured to convert an illumination beam into an image beam, wherein the imaging system comprises a first prism, a second prism, and a light valve, wherein the first prism comprises a first surface and a second surface, and an included angle between the first surface and the second surface is an acute angle, the illumination beam is sequentially transmitted to the first prism, the second prism, and the light valve, the light valve is configured to convert the illumination beam into the image beam, and the image beam is then transmitted to the second prism and passes the second prism, wherein the illumination beam is incident to the first prism with a first incident direction, and exits the first prism with a first exit direction, the first incident direction is perpendicular to the first exit direction, and beam cross-sectional areas of the illumination beam before incident on and after exiting from the first prism are different.

2. The imaging system according to claim 1, wherein the illumination beam sequentially passes through the first surface of the first prism, is reflected by the second surface of the first prism, and then passes through the first surface to exit from the first surface.

3. The imaging system according to claim 2, wherein the illuminating beam is incident to the first surface with a first incident angle, and exits from the first surface with a first exit angle, a difference between the first incident angle and an absolute value of the first exit angle falls within a range of 0 degrees to 15 degrees.

4. The imaging system according to claim 1, wherein the imaging system satisfies a conditional formula as follows:

$$\alpha = \sin^{-1}\left[\left(\frac{n1}{n2}\right) \times (90 - \varphi)\right] - \sin^{-1}\left[\left(\frac{n1}{n2}\right) \times \varphi\right],$$

wherein α is the included angle between the first surface and the second surface, n1 is a refractive index of a transmission medium outside the first prism, n2 is a refractive index of the first prism, φ is an included angle between the first surface and a first reference plane, and the first reference plane is a plane perpendicular to the first incident direction.

5. The imaging system according to claim 1, wherein the illumination beam is expanded or converged in a direction parallel to the first incident direction.

6. The imaging system according to claim 1, further comprising a third prism, wherein the third prism comprises a third surface and a fourth surface, and an included angle between the third surface and the fourth surface is an acute angle, wherein the illumination beam is incident on the third prism, exits from the third prism, and is then transmitted to the second prism sequentially after exiting from the first prism, wherein the illuminating beam is incident on the third prism in a second incident direction, and exits from the third prism in a second exit direction, the second incident direction and the second exit direction are perpendicular to each other, and wherein beam cross-sectional areas of the illumination beam before incident on and after exiting from the third prism are different.

7. The imaging system according to claim 6, wherein the illumination beam sequentially penetrates the third surface, reflects off the fourth surface, penetrates the third surface again, and exits from the third prism.

8. The imaging system according to claim 6, wherein imaging system satisfies a conditional formula as follows:

$$\alpha' = \sin^{-1}\left[\left(\frac{n1'}{n2'}\right) \times (90 - \varphi')\right] - \sin^{-1}\left[\left(\frac{n1'}{n2'}\right) \times \varphi'\right],$$

wherein $\alpha'$ is the included angle between the third surface and the fourth surface, $n1'$ is a refractive index of a transmission medium outside the third prism, $n2'$ is a refractive index of the third prism, $\varphi'$ is an included angle between the third surface and a second reference plane, and the second reference plane is a plane perpendicular to the second incident direction.

9. The imaging system according to claim 6, wherein illumination beam is expanded or converged in a direction parallel to the second incident direction.

10. The imaging system according to claim 6, wherein first incident direction and the second incident direction are different.

11. The imaging system according to claim 1, wherein the illumination beam is reflected by the second prism to the light valve after entering the second prism, and the image beam enters, penetrates, and exits from the second prism after being transmitted to the second prism from the light valve.

12. The imaging system according to claim 1, wherein the illumination beam is transmitted to the light valve after entering and penetrating the second prism, and the image beam is reflected by, penetrates, and exits from the second prism after being transmitted to the second prism from the light valve.

13. A projection apparatus, comprising a light source, an imaging system, and a projection lens, the light source is configured to provide an illumination beam, the imaging system is configured to convert the illumination beam into an image beam, the projection lens is disposed on a transmission path of the image beam and is configured to project the image beam out of the projection apparatus, and the imaging system comprises a first prism, a second prism, and a light valve, wherein the first prism comprises a first surface and a second surface, and an included angle between the first surface and the second surface is an acute angle, the illumination beam is incident on the first prism, exits from the first prism, is transmitted to the second prism, is transmitted to the light valve through the second prism, and is then converted into the image beam by the light valve sequentially, and the image beam is then transmitted to and exits from the second prism, wherein the illumination beam is incident to the first prism with a first incident direction, and exits the first prism with a first exit direction, the first incident direction is perpendicular to the first exit direction, and beam cross-sectional areas of the illumination beam before incident on and after exiting from the first prism are different.

14. The projection apparatus according to claim 13, wherein the illumination beam sequentially passes through the first surface, is reflected by the second surface, and then passes through the first surface to exit from the first surface.

15. The projection apparatus according to claim 14, wherein the illuminating beam is incident to the first surface with a first incident angle, and exits from the first surface with a first exit angle, a difference between the first incident angle and an absolute value of the first exit angle falls within a range of 0 degrees to 15 degrees.

16. The projection apparatus according to claim 13, wherein the imaging system satisfies a conditional formula as follows:

$$\alpha = \sin^{-1}\left[\left(\frac{n1}{n2}\right) \times (90 - \varphi)\right] - \sin^{-1}\left[\left(\frac{n1}{n2}\right) \times \varphi\right],$$

wherein $\alpha$ is the included angle between the first surface and the second surface, $n1$ is a refractive index of a transmission medium outside the first prism, $n2$ is a refractive index of the first prism, $\varphi$ is an included angle between the first surface and a first reference plane, and the first reference plane is a plane perpendicular to the first incident direction.

17. The projection apparatus according to claim 13, wherein the illumination beam is expanded or converged in a direction parallel to the first incident direction.

18. The projection apparatus according to claim 13, further comprising a third prism, wherein the third prism comprises a third surface and a fourth surface, and an included angle between the third surface and the fourth surface is an acute angle, wherein the illumination beam is incident on the third prism, exits from the third prism, and is then transmitted to the second prism sequentially after exiting from the first prism, wherein the illuminating beam is incident on the third prism in a second incident direction, and exits from the third prism in a second exit direction, the second incident direction and the second exit direction are perpendicular to each other, and wherein beam cross-sectional areas of the illumination beam before incident on and after exiting from the third prism are different.

19. The projection apparatus according to claim 18, wherein the illumination beam sequentially penetrates the third surface, reflects off the fourth surface, penetrates the third surface again, and exits from the third prism.

20. The projection apparatus according to claim 18, wherein the imaging system satisfies a conditional formula as follows:

$$\alpha' = \sin^{-1}\left[\left(\frac{n1'}{n2'}\right) \times (90 - \varphi')\right] - \sin^{-1}\left[\left(\frac{n1'}{n2'}\right) \times \varphi'\right],$$

wherein $\alpha'$ is the included angle between the third surface and the fourth surface, $n1'$ is a refractive index of a transmission medium outside the third prism, $n2'$ is a refractive index of the third prism, $\varphi'$ is an included angle between the third surface and a second reference plane, and the second reference plane is a plane perpendicular to the second incident direction.

21. The projection apparatus according to claim 18, wherein the illumination beam is expanded or converged in a direction parallel to the second incident direction.

22. The projection apparatus according to claim 18, wherein the first incident direction and the second incident direction are different.

23. The projection apparatus according to claim 13, wherein the illumination beam is reflected by the second prism to the light valve after entering the second prism, and the image beam enters, penetrates, and exits from the second prism after being transmitted to the second prism from the light valve.

24. The projection apparatus according to claim 13, wherein the illumination beam is transmitted to the light valve after entering and penetrating the second prism, and the image beam is reflected by, penetrates, and exits from the second prism after being transmitted to the second prism from the light valve.

\* \* \* \* \*